Feb. 1, 1949.    C. R. STEVENS    2,460,547
DRAWING CRUCIBLE
Filed Oct. 7, 1946
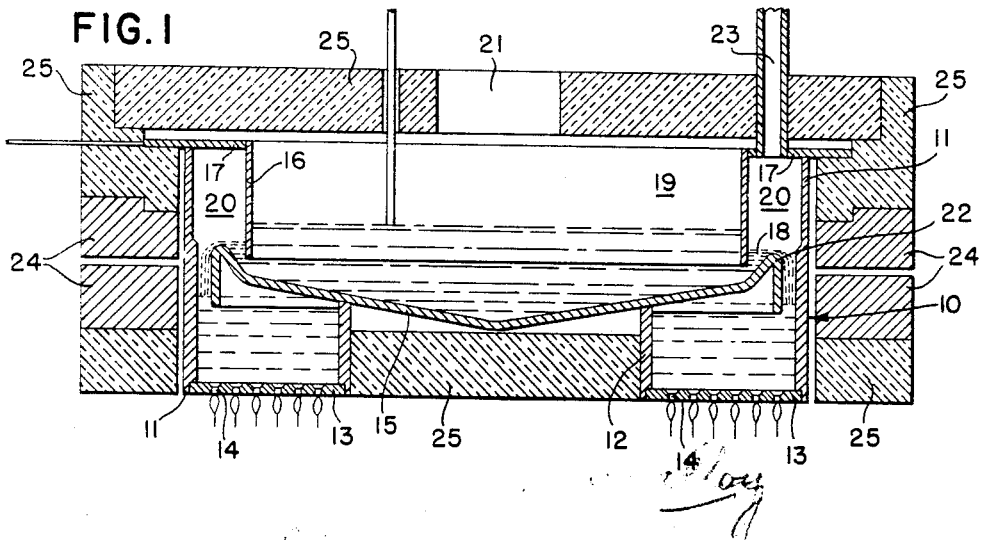
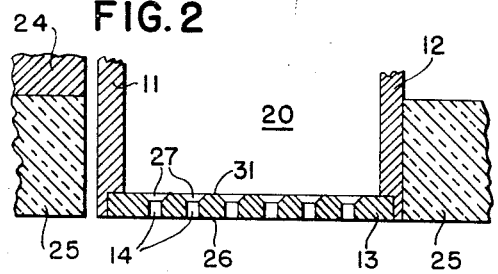
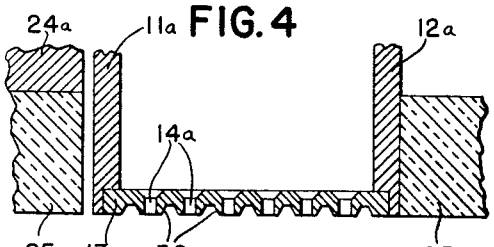
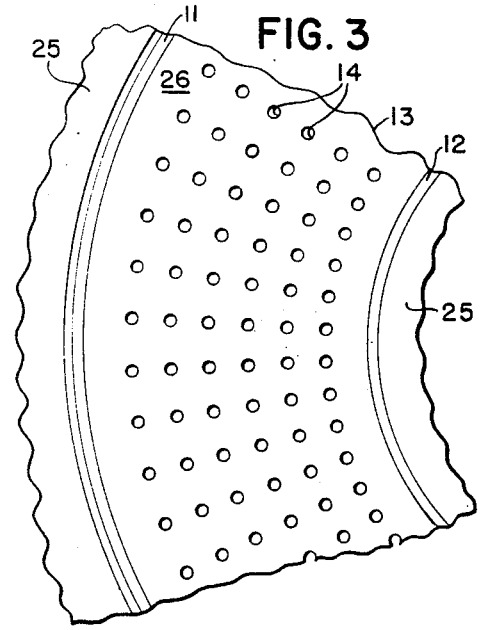
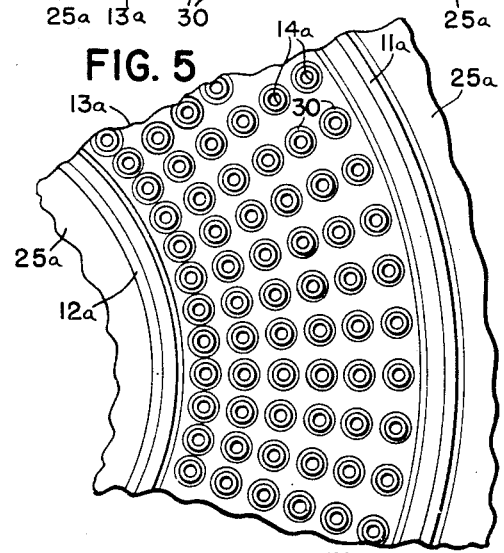
INVENTOR
CHARLES R. STEVENS
BY
Toulmin & Toulmin
ATTORNEYS Patented Feb. 1, 1949

2,460,547

UNITED STATES PATENT OFFICE 2,460,547

DRAWING CRUCIBLE

Charles R. Stevens, Toledo, Ohio, assignor, by mesne assignments, to Glass Fibers, Inc., Waterville, Ohio Application October 7, 1946, Serial No. 701,823

11 Claims. (Cl. 49—55)

This invention relates to apparatus for the drawing of glass fibers or filaments, and particularly concerns a crucible having a plurality of orifices in one wall thereof through which molten glass exudes from within the crucible so that glass fibers or filaments can be drawn from the molten glass.

The practice of drawing glass into fine fibers or filaments is now well known. Fibers of a diameter of .00025" to .00035" are drawn on a commercial scale. However, to draw perfectly fibers of such small diameter, it is essential that there be no foreign extraneous matter introduced into the glass during the time it is being drawn into the fine fibers.

To draw such fine fibers, molten glass is exuded through small orifices provided in a wall of a melting crucible in which a body of glass is maintained in molten condition. As the glass exudes from the small orifices, the glass is mechanically drawn to produce fine fibers or filaments. It is essential that the small quantity of glass on the discharge side of the orifices be maintained uniform in quantity and condition at all times to avoid variation in the diameter of the drawn glass fibers.

It is well known that molten glass has an affinity for the surface of most materials, particularly the metals, and "wets" the surface of the material. If the surface around the orifices through which the molten glass exudes is allowed to be wetted by the molten glass, small quantities of excess molten glass become stored upon the surfaces adjacent the orifices and gradually built up to a point that the excess drops off into the drawn fiber or filament, thus producing small balls of glass carried on the fiber or filament. Also, the molten glass will creep over the surface of the orifice plate causing the filament from adjacent orifices to draw together.

When drawing glass filaments for use in spinning into threads for the textile industry, such irregularities cannot be tolerated.

It is therefore an object of this invention to provide an orifice plate through which molten glass exudes that has at least the surface on the discharge side of the orifices constructed of an alloy that is not wet by molten glass. Such an alloy has been found in a platinum-rhodium alloy wherein the rhodium content of the alloy is not less than 40% of the alloy.

It is another object of the invention to provide an orifice plate through which molten glass is exuded wherein the orifice plate comprises an alloy consisting of 60% platinum and 40% rhodium.

It is another object of the invention to provide an aperture plate through which molten glass is exuded, consisting of a platinum-rhodium alloy in which the rhodium content of the alloy is at least 40% of the alloy and the face of the orifice plate on the discharge side of the orifices is a flat surface.

Still another object of the invention is to provide an orifice plate constructed from a platinum rhodium alloy comprising at least 40% rhodium, wherein the orifices are straight holes receding from a flat surface on the discharge side of the orifice plate.

Further objects and advantages will become apparent from the drawings and the following description:

In the drawings:

Figure 1 is a vertical cross-sectional view through an apparatus incorporating the features of this invention.

Figure 2 is an enlarged partial vertical cross-sectional view of the orifice plate.

Figure 3 is a bottom elevational view of a portion of the orifice plate illustrated in Fig. 2.

Figure 4 is a vertical cross-sectional view of a portion of an orifice plate illustrating the manner in which the prior art formed the orifice plate on the discharge side of the orifices.

Figure 5 is a bottom elevational view of a portion of the orifice plate illustrated in Fig. 4.

In producing glass fibers or glass filaments, a body of glass is heated to a molten condition in a crucible. The crucible is provided with a wall having a plurality of small orifices through which the molten glass exudes. The molten glass that exudes through the small orifices is picked up mechanically and drawn into fine filaments. An apparatus in which glass can be heated and from which fibers or filaments are drawn is illustrated in Figure 1 and is shown by way of example only, since the apparatus may take any desired form or shape.

The apparatus illustrated in Figure 1 comprises a heating crucible 10 having an outer cylindrical wall 11 and an inner cylindrical wall 12. An orifice plate 13 having orifices 14 therein connects between the inner and outer walls 11 and 12. A dish-shaped member 15 is carried upon the inner wall 12 and cooperates with a cylindrical wall 16 carried by the top wall 17 to form a liquid trap 18 between the melting chamber 19 and the drawing chamber 20. Glass material is introduced into the melting chamber 19 through the opening 21 to replenish the glass used from the drawing chamber 20, glass flowing from the melting chamber 19 into the drawing chamber 20 over the planing edge 22 provided on the member 15.

Gas under pressure is supplied into the drawing chamber 20 through a conduit 23 to aid in exuding the glass through the orifices 14. Glass contained within the crucible 10 is heated and maintained in a molten condition by means of the coils 24 which may heat the glass either by high frequency induction heat, or resistance heat.

The crucible 10 is provided with heat-insulating walls 25 to reduce radiation of heat from the crucible.

The orifice plate 13 is more particularly shown in Figures 2 and 3. This plate consists of a circular sheet-metal member having the lower flat face or surface 26 through which the orifices 14 discharge. The orifices 14 may have recessed portions 27 in the inner ends thereof within the drawing chamber 20 to provide for a more even flow and distribution of glass into the orifices. The orifice plate 13 is secured to the walls 11 and 12 in any desired manner, such as brazing.

In this invention, the orifice plate 13 is constructed of a platinum-rhodium alloy in which the rhodium content of the alloy is at least 40% of the total content of the alloy, the remaining part of the alloy being platinum. It has been determined that an alloy of platinum and rhodium wherein rhodium constitutes at least 40% of the alloy, is not wettable by molten glass. It is well known that platinum and platinum-rhodium alloys are not attacked by molten glass, thus making their use as melting crucibles for molten glass a commercially practical consideration, but to the knowledge of this applicant, alloys of platinum and rhodium wherein the rhodium content of the alloy is at least 40% of the total content of the alloy have not been used in connection with the melting of glass, and particularly have not been used as the orifice plate from which fine glass fibers or filaments are drawn.

Since it has been found that a platinum-rhodium alloy containing at least 40% rhodium is not wettable by molten glass, many of the difficulties encountered in the drawing of glass fibers using other metals or other alloys for the orifice plate have been overcome, and the construction of the orifice plate is greatly simplified.

In Figures 4 and 5 there is illustrated an orifice plate for use in connection with the drawing of glass fibers or filaments that is constructed in accordance with the prior art. The particular and peculiar formation of the orifice plate has been required to prevent molten glass from creeping over the surface of the orifice plate adjacent the discharge side of the orifices. Creepage of glass over the orifice plate has resulted in obtaining uneven fiber diameters caused by joining of adjacent fibers, and has resulted in causing small glass balls to be carried away from the orifice plate by the fibers due to excess of molten glass adhering to the surface of the orifice plate.

It has been the prior practice, as shown in Figures 4 and 5, to have the face of the orifice plate 13a around each of the orifices 14a recessed into the body of the plate so that each of the orifices 14a would have, on the discharge side thereof, a raised protrusion 30. It was found that this raised protrusion 30 around each of the individual orifices 14a prevented creeping of the molten glass from one orifice to another and avoided collection of excess glass on the surface of the orifice plate. However, the manufacture of an orifice plate in accordance with the structure shown in Figures 4 and 5 is an expensive procedure.

The orifice plate of this invention illustrated in Figures 2 and 3, constructed of a platinum-rhodium alloy in which the rhodium content of the alloy is at least 40% of the total content of the alloy, comprises a plate having the parallel lower and upper surfaces 26 and 31, respectively. If desired, the plate 13 can be a bi-metal plate in which the lower portion of the plate having the surface 26 is constructed of the platinum-rhodium alloy of this invention. The orifices 14 are straight holes receding from the lower surface 26 of the orifice plate 13. Since the platinum-rhodium alloy of which the orifice plate 13 is constructed is not wettable by molten glass, creepage of the glass from one orifice to another and collection of excess of molten glass on the bottom surface 26 of the orifice plate 13 is avoided. It will be appreciated that the manufacture of the orifice plate 13 illustrated in Figure 2 will be less complicated and less costly than the manufacture of the orifice plate 13a illustrated in Figs. 4 and 5 made according to the prior practice.

While the invention has been disclosed with reference to the fact that the orifice plate 13 illustrated in Figs. 1, 2 and 3 is constructed of a platinum-rhodium alloy in which the rhodium content of the alloy is at least 40% of the total content of the alloy, yet it will be understood that the entire crucible 10 could be constructed of the alloy, should it be desirable.

While the device disclosed herein constitutes a preferred form of the invention, yet it will be understood that all modifications that fall within the scope of the appended claims are intended to be included herein.

Having thus fully described my invention, what I claim as new and desire to secure by Letters Patent is:

1. In a melting crucible for glass, a wall having a plurality of orifices therein, said wall having at least the surface thereof on the discharge side of the orifices formed of a platinum-rhodium alloy consisting of at least 40% rhodium.

2. An orifice plate for a glass melting crucible, said plate containing a plurality of orifices and constructed of a platinum-rhodium alloy consisting of at least 40% rhodium.

3. In a glass-melting device, a chamber for melting glass having a wall therein provided with a plurality of orifices through which the molten glass from said chamber is exuded, said wall containing said orifices being constructed of a platinum-rhodium alloy consisting of at least 40% rhodium.

4. A melting crucible for glass having a wall thereof provided with a plurality of orifices through which glass from said crucible is exuded, said wall having the surface thereof on the discharge side of the orifices co-extensive with the form of a surface joining the discharge side of said orifices, at least said surface being formed of a platinum-rhodium alloy consisting of at least 40% rhodium.

5. A heating and melting crucible for glass having a wall thereof provided with a plurality of orifices through which molten glass from the crucible is exuded, said wall containing said orifices having the surface thereof at least on the discharge side of said orifices constructed of a platinum-rhodium alloy consisting of at least 40% rhodium.

6. An orifice plate for a melting crucible for glass having a plurality of orifices therein, said orifice plate having the surface thereof at least on the discharge side of said orifices constructed of a platinum-rhodium alloy consisting of at least 40% rhodium.

7. An orifice plate for a melting crucible for glass having a plurality of straight-sided openings therein receding from the surface of the discharge side of the orifice plate and in which at least the surface of the discharge side of the orifice plate is composed of a platinum-rhodium alloy consisting of at least 40% rhodium.

8. An orifice plate for a heating and melting crucible for glass having a plurality of straight-sided openings receding from one planar surface thereof, at least said planar surface being composed of a platinum-rhodium alloy consisting of at least 40% rhodium.

9. A heating and melting device for glass comprising a heating chamber in which glass is heated and melted to place the glass in a molten condition, one wall of said chamber having a plurality of openings therein receding as straight-sided openings from the exterior surface of said wall, at least said exterior surface of said wall extending between said openings being composed of a platinum-rhodium alloy consisting of at least 40% rhodium.

10. An orifice plate for a melting crucible for glass having a plurality of orifices therein through which glass exudes, comprising, a plate having a plurality of orifices therein through which glass exudes, said orifices receding from the discharge side of said plate as straight-sided holes at least adjacent the discharge surface side of said plate, said discharge surface side of said plate being a smooth non-undulating surface comprising a platinum-rhodium alloy consisting of at least 40% rhodium.

11. An orifice plate for a melting crucible for glass having a plurality of orifices therein through which glass exudes, comprising, a plate having a plurality of orifices therein through which glass exudes, said orifices receding from the discharge side of said plate as straight-sided holes at least adjacent the discharge surface side of said plate, said discharge surface side of said plate consisting of a flat surface comprising a platinum-rhodium alloy consisting of at least 40% rhodium.

CHARLES R. STEVENS.

REFERENCES CITED

The following references are of record in the file of this patent:

UNITED STATES PATENTS

| Number | Name | Date |
| --- | --- | --- |
| 1,850,818 | Waltenberg et al. | Mar. 22, 1932 |
| 1,990,277 | Feussner et al. | Feb. 5, 1935 |
| 2,031,083 | Weller | Feb. 18, 1936 |
| 2,165,318 | Thomas et al. | July 11, 1939 |
| 2,188,636 | Vilensky | Jan. 30, 1940 |
| 2,190,296 | Richardson | Feb. 13, 1940 |
| 2,239,561 | Hopps | Apr. 22, 1941 |

FOREIGN PATENTS

| Number | Country | Date |
| --- | --- | --- |
| 3,174 | Great Britain | Dec. 28, 1857 |